United States Patent [19]

Miyahara et al.

[11] Patent Number: 5,165,043

[45] Date of Patent: Nov. 17, 1992

[54] MEMORY CARD SYSTEM AND ACCESS METHOD FOR MEMORY CARD

[75] Inventors: Koji Miyahara, Owariasahi; Shigeo Kikuta, Aichi; Tateo Yokoyama, Nagoya, all of Japan

[73] Assignee: Hitachi, Ltd., Tokyo, Japan

[21] Appl. No.: 491,449

[22] Filed: Mar. 9, 1990

[30] Foreign Application Priority Data

Mar. 15, 1989 [JP] Japan .................... 1-60958

[51] Int. Cl.$^5$ .................. G06K 5/00; G06K 19/06
[52] U.S. Cl. .................... 235/380; 235/492
[58] Field of Search .......... 235/380, 492, 382, 441; 364/200 MS, 900 MS; 369/59, 53, 57; 360/48, 2; 395/400

[56] References Cited

U.S. PATENT DOCUMENTS

| | | | |
|---|---|---|---|
| 4,841,131 | 6/1989 | Iijima | 235/380 |
| 4,849,614 | 7/1989 | Watanabe et al. | 235/380 |
| 4,868,376 | 9/1989 | Lessin et al. | 235/492 |
| 4,887,234 | 12/1989 | Iijima | 235/380 |
| 4,901,276 | 2/1990 | Iijima | 235/380 X |
| 4,949,240 | 8/1990 | Iijima | 235/380 X |
| 4,984,149 | 1/1991 | Iwashita et al. | 364/200 |

*Primary Examiner*—John W. Shepperd
*Assistant Examiner*—Tan Nguyen
*Attorney, Agent, or Firm*—Fay, Sharpe, Beall, Fagan, Minnich & McKee

[57] ABSTRACT

A memory card comprises an index area, and a data area including a plurality of extents in each of which data is recorded. The index area includes in correspondence with each of the extents, an area for entering a file name, a status indicating area for entering the number of bytes to be recorded per sector, and areas for entering the beginning and end addresses of the corresponding extent, respectively. The memory card is accessed in such a way that the index area is read to decide if a desired file name exists, and that the status indicating area is read subject to the existence of the desired file name. A control unit translates an address premised on a floppy disc into an address for accessing the memory card, on the basis of the number of bytes entered in the status indicating area, and then accesses the memory card.

9 Claims, 3 Drawing Sheets

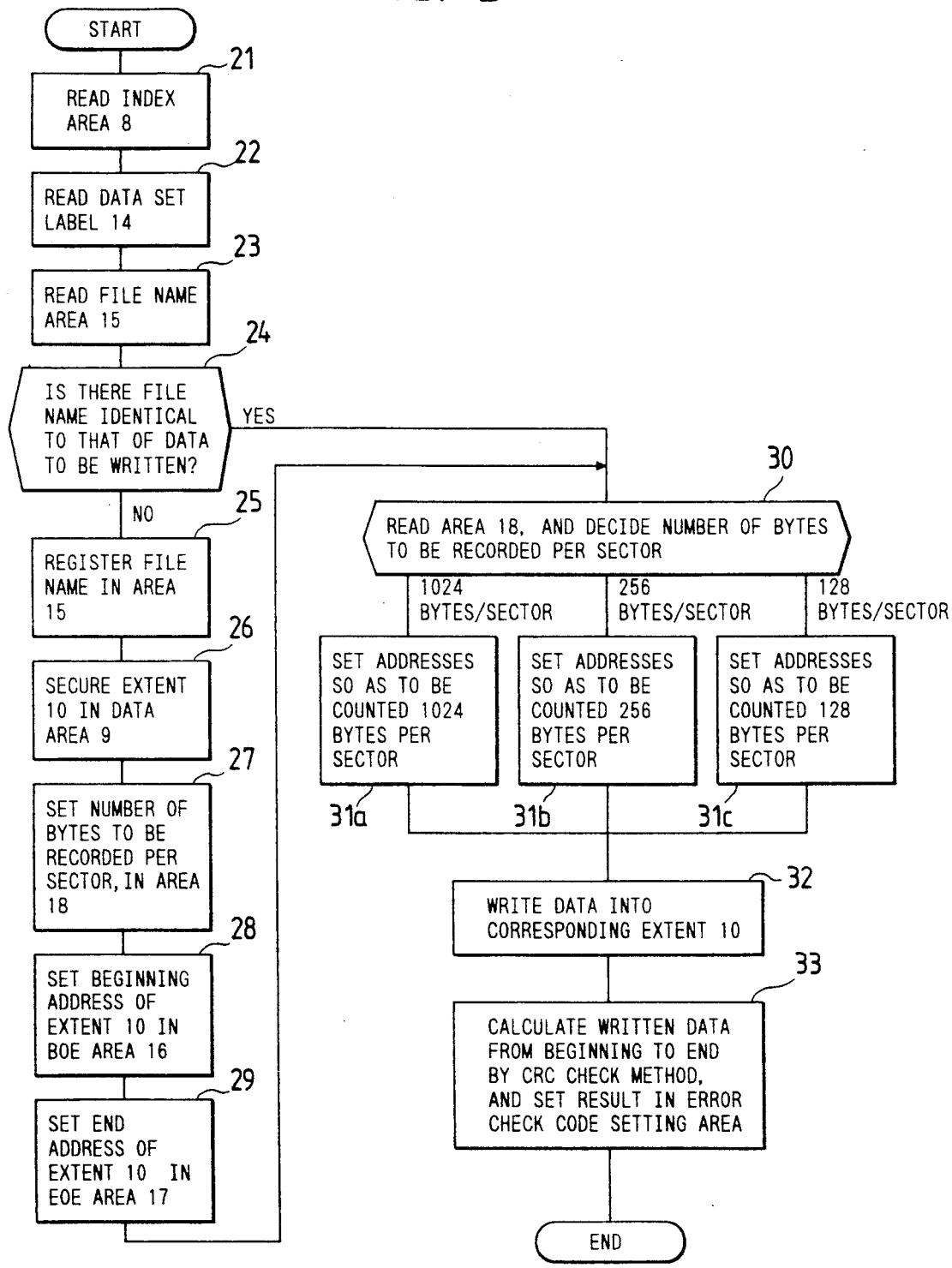

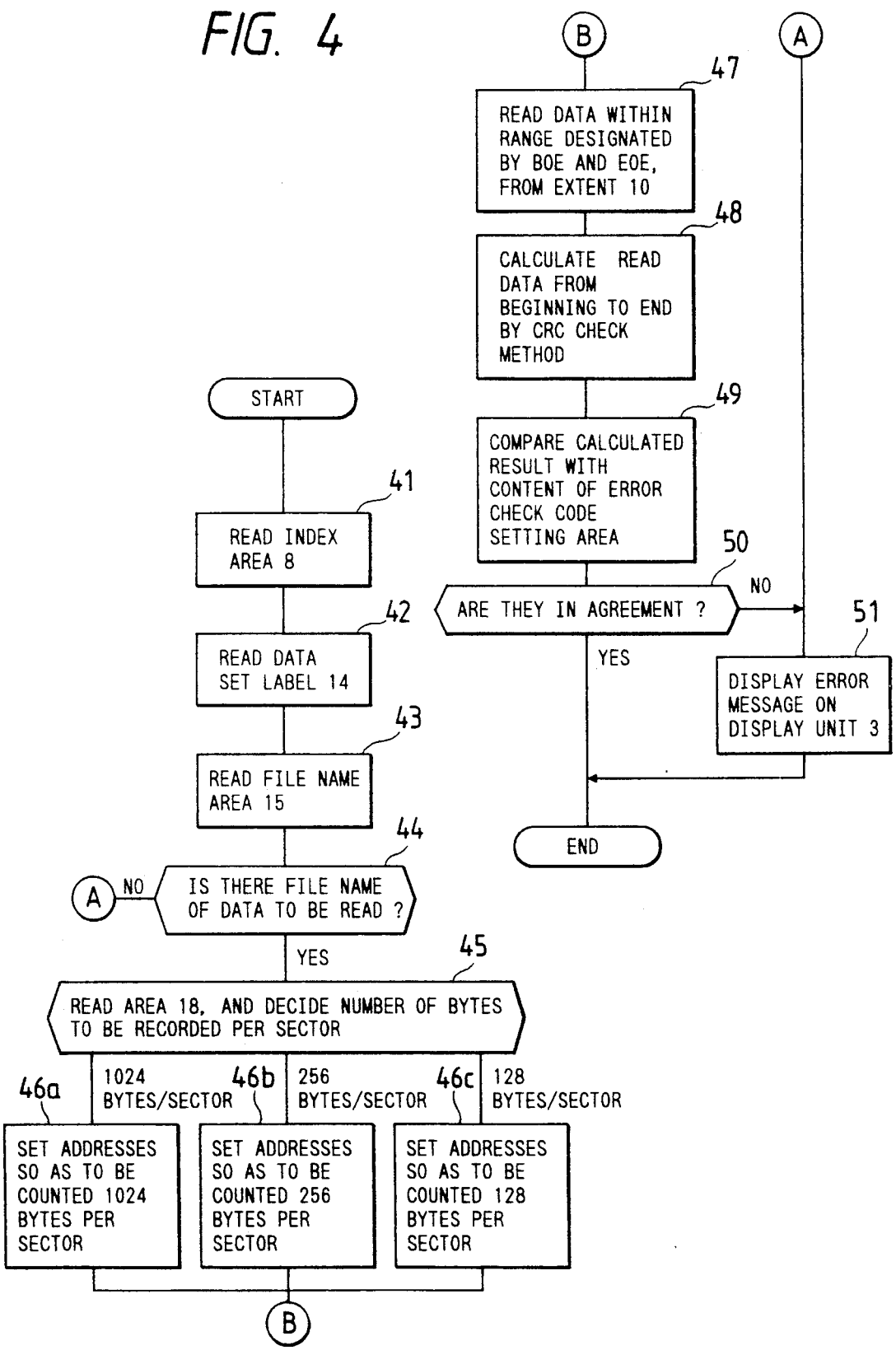

MEMORY CARD SYSTEM AND ACCESS METHOD FOR MEMORY CARD

BACKGROUND OF THE INVENTION

The present invention relates to a memory card system and an access method for memory cards. More particularly, it relates to a system having a memory card which is rendered versatile as a data filing medium.

Magnetic discs represented by floppy discs have generally been employed as data file media in data processing systems. Recently, a memory card having a built-in IC memory chip has been developed and has come into use also as a data file medium. In a case of utilizing the memory card as the data file medium, the recording format thereof can be determined independently of that of the floppy disc. Since, however, the floppy disc has long been used as the data file medium and software premised on the floppy disc has been accumulated, the recording formats of the memory cards should be arranged such that they can accept the recording format of the floppy disks, in order to render the memory card a versatile data file medium. The recording format of the floppy disc is configured of an index area and a data area. The index area holds file names serving as the indexes of the data area, the addresses of the data area, etc.

The official gazette of Japanese Patent Application Laid-open No. 138483/1988 discloses an IC card device, the memory of which is composed of a management area and a data area. The management area bears management data which includes the label names, addresses and data lengths of the data area.

The official gazette of Japanese Patent Application Laid-open No. 184889/1988 discloses an IC card having a built-in IC chip, the memory of which is composed of a plurality of areas [00-FF. The area [00] bears information which defines the start addresses, area sizes and data output methods of the areas [01-FF].

The recording formats of both the patent applications laid open are similar to that of the floppy disc.

To allow data to be accessed, the floppy disc has its data positions designated by track addresses and sector addresses. In addition, there are several kinds of floppy discs in which the numbers of bytes to be recorded per sector vary, i.e. 128, 256, 1024, etc. Data is not transferrable between media having unequal numbers of bytes to be recorded per sector. The concepts of tracks and sectors are not included in the above discussed memory cards, and the data transfer between the memory cards is possible. However, in the case of utilizing the memory cards as the data file media to replace the floppy discs, memory cards need to be compatible with the floppy discs and to transfer data from and to the floppy discs.

An object of the present invention is to provide a memory card the data of which is compatible with the filed data of a floppy disc.

Another object of the present invention is to provide a memory card system and a method which serve to access such a memory card.

SUMMARY OF THE INVENTION

The memory card is composed of an index area, and a data area including a plurality of extents in each of which data is recorded. The index area of the memory card contains in correspondence with each of the extents, an area in which a file name is entered, a status indicating area in which the number of bytes to be recorded per sector is entered, and areas in which the beginning and end addresses of the corresponding extent are respectively entered. Thus, the memory card is compatible with the floppy disc.

The memory card system also includes a control unit which accesses one of the extents by reference to the index area.

In accessing the memory card, the index area is read, and it is decided if a desired file name exists. The status indicating area is read in response to the existence of the desired file name, and a given address is translated into an address for accessing the memory card, on the basis of the number of bytes entered in the status indicating area.

BRIEF DESCRIPTION OF THE DRAWINGS

FIG. 3 is a flow chart showing a sequence for writing data into the memory card; and FIG. 4 is a flow chart showing a sequence for reading out data from the memory card.

DESCRIPTION OF THE PREFERRED EMBODIMENTS

Now, embodiments of the present invention will be described in detail with reference to the drawings.

Figure 1:
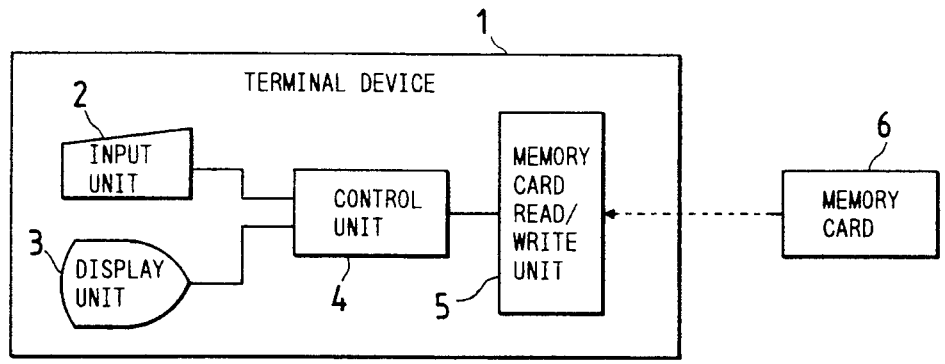
FIG. 1 is a block diagram showing a hardware arrangement for performing the present invention.

Referring to FIG. 1, a terminal device 1 comprises an input unit 2, a display unit 3, a control unit 4, and a memory card read/write unit 5 into which a memory card 6 is inserted. The memory card 6 is, for example, an IC memory card which has an IC memory chip.

Figure 2:
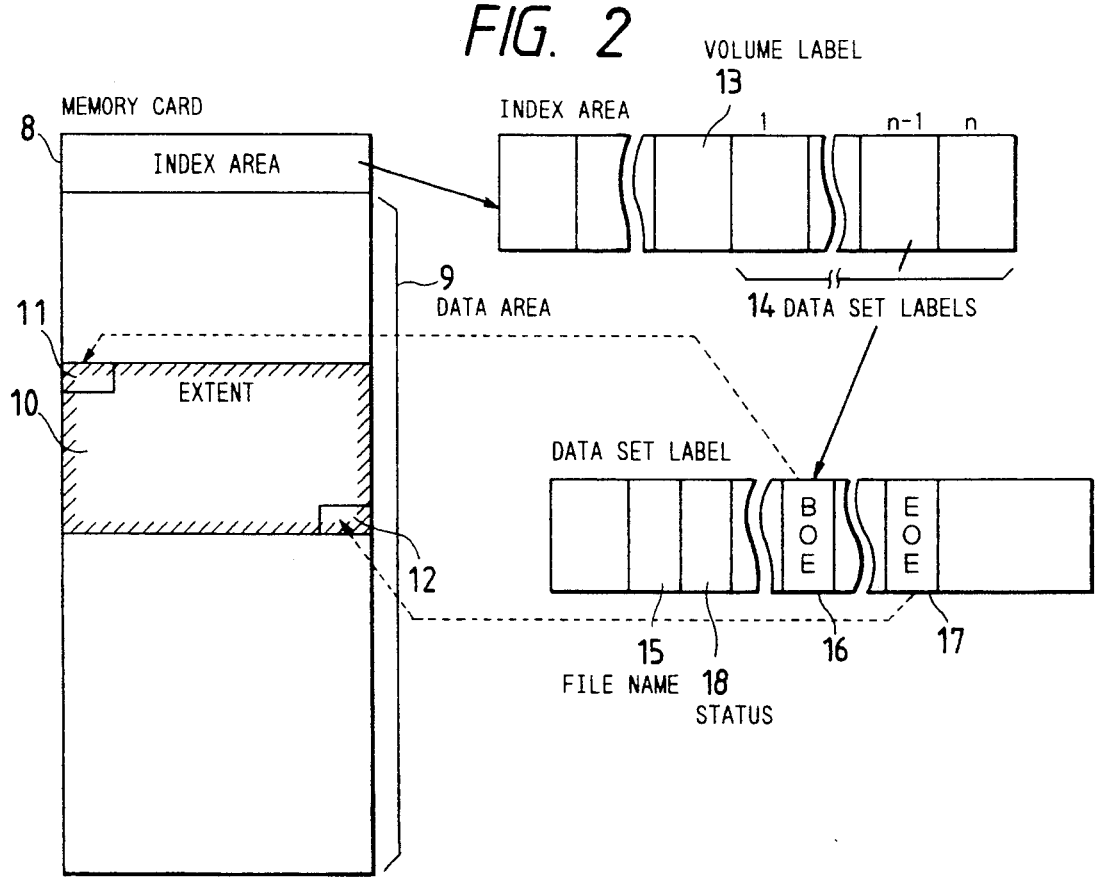
FIG. 2 is a diagram showing the recording format of a memory card depicted in FIG. 1.

FIG. 2 shows the recording format of the memory card 6. The memory card 6 is composed of an index area 8 and a data area 9. The data area 9 includes a plurality of extents 10 in which data is written.

The index area 8 includes a volume label 13 and a plurality of data set labels 14. The data set labels 14 and the extents 10 are in one-to-one correspondence. Each data set label 14 contains a file name area 15, a status indicating area 18, a beginning address area 16 and an end address area 17. The file name of the corresponding extent 10 is entered in the file name area 15. The beginning address of extent BOE of the corresponding extent 10 and the end address of extent EOE thereof are respectively entered in the beginning address area 16 and the end address area 17. Herein, the memory card 6 seems to be a floppy disc when viewed from the terminal device 1. The track address and sector address of the floppy disc which is being read are respectively recorded, as the BOE and EOE addresses and not the addresses of the memory card itself. The status indicating area 18 bears the number of bytes to be recorded per sector in the case where the data of the file specified in the file name area 15 is recorded on the floppy disc.

FIG. 3 shows a data writing sequence, while FIG. 4 shows a data reading sequence.

In writing data into the memory card 6 by means of the terminal device 1, a request for the display of a guidance frame is made by the input unit 2 of the terminal device 1. Then, the data of the guidance frame is displayed on the display unit 3 under the control of the control unit 4.

When the guidance frame is displayed on the display unit 3, an operator supplies input data from the input unit 2 in accordance with the instructions of the guidance frame. When the data input operation from the input unit 2 ends, the control unit 4 records data on the memory card 6 through the memory card read/write unit 5. The information is written into the information writing area of the memory card 6 in conformity with the format of this memory card illustrated in FIG. 2.

In the case of recording data on the memory card 6, an operating flow proceeds as illustrated in FIG. 3. First, the index area 8 is read, and the file name areas 15 of the data set labels 14 are retrieved, so as to decide if the same file name as that of the data to be recorded exists (steps 21-24). If the same file name, the file name does not exist of the data to be written is registered in the head of the first of empty file name areas 15 (step 25).

After the registration of the file name, the area (extent) into which the corresponding data is to be written is secured within the data area 9 (step 26). Thereafter, the number of data bytes to be recorded per sector, which is given by the control unit 4, is set in the status indicating area 18, and the BOE and EOE of the extent 10 secured in the data area 9 are respectively set in the areas 16 and 17 (steps 27-29).

Subsequently, the status indicating area 18 dealt with as described above is read to decide the number of bytes per sector (step 30). If the file name of the data to be written is already entered in the file name area 15 of any data set label 14, the step 24 is followed by step 30 to decide the number of bytes. Addresses are set so as to be counted in accordance with the number of bytes entered in the area 18 (step 31a, 31b or 31c). More specifically, addresses recognized in the control unit 4 are expressed by the track and sector addresses of the floppy disc, and they need to be translated into addresses for accessing the memory card. The translation conforms to the following formula:

$$MCA = n \cdot TA + (SA - 1) \cdot D$$

MCA: byte address of the memory card,
n: number of sectors/track (for example, 26),
TA: track address which begins with 0,
SA: sector address which begins with 1,
D: number of bytes/sector, which is entered in the area 18 (for example, 128, 256 or 1024).

Thus, the track and sector addresses of the floppy disc are translated by the control unit 4 into the address of the memory card, with which the memory card 6 is permitted to be accessed.

In a case where data recorded on the memory card 6 is read by the terminal device 1, an operating flow proceeds as illustrated in FIG. 4. The index area 8 of the memory card 6 is read so as to decide if the file name of the data to be read is entered in the file name area 15 of any data set label 14 (steps 41-44). If the file name is entered, the status indicating area 18 is read to decide the number of bytes per sector, and addresses are set so as to be counted in accordance with the number of bytes entered in the area 18 (steps 45-46c). That is, the track and sector addresses entered in the BOE and EOE areas 16, 17 are translated into the addresses of the memory card in conformity with the formula mentioned above. Thereafter, the data within a range designated by the translated BOE and EOE is read out of the data area (extent) 10 (step 47). On the other hand, if the file name of the data to be read is not entered in any of the file name areas 15 of the data set labels 14, the step 44 is followed by a step 51 at which an error message is displayed on the display unit 3.

In recording data on the memory card 6, the format of the data recording is conformed to, for example, the data writing format of the floppy disc medium in order to be rendered standard and versatile. As described before, the interior of the memory card 6 is divided into, at least, the index area 8 and the data area 9, the index area 8 is provided with, at least, the volume label 13 and the data set labels 14, and each of the data set labels 14 is provided with, at least, the file name area 15, the status indicating area 18, the BOE area 16 and the EOE area 17. Thus, the data recording format of the memory card 6 is permitted to be standardized.

Moreover, the data recording format of the memory card 6 is arranged to that of the floppy disc medium, whereby the compatibility of file data can be established between the memory card 6 and the floppy disc medium. In addition, the number of data bytes to be recorded per sector is entered in the status indicating area 18, whereby the memory card 6 can be endowed with the data compatibility with several sorts of floppy discs of 128 bytes/sector, 256 bytes/sector, 1024 bytes/sector, etc.

As one method of checking the error of data, in the mode of writing data into the memory card 6 as illustrated in FIG. 3, when the data to be recorded has been written into the extent 10 (step 32), the written data from the beginning to the end thereof is calculated by the CRC check method, and the result may well be set in an error check code setting area 12 provided at the end of the extent 10 (step 33).

In the mode of reading the memory card 6 as illustrated in FIG. 4, that part of data recorded in the extent 10 which lies from the beginning of this extent to the position thereof immediately before the error check code setting area 12 is calculated by the CRC check method (step 48), and the calculated result is compared with the content of the error check code setting area 12 (step 49). When they agree here, the data writing and reading operations can be regarded as having been correctly performed (step 50). In contrast, when the result of the comparison is disagreement, the data writing and reading operations can be regarded as having been incorrect, and an error message can be displayed on the display unit 3 (step 51).

According to the present invention, a memory card becomes usable as a versatile medium simultaneously with, for example, a floppy disc medium and therefore becomes usable as one of media capable of transferring data from and to different devices.

We claim:

1. A memory card system comprising:
a memory card including:
a data area including a plurality of extents in which data is recorded in a file for selective translation from the card with a variable sector byte density comprising a number of bytes to be recorded per a sector for each file,
an index area corresponding with each of said plurality of extents and including an area for entering a file name, a status indicating area for entering the number of bytes to be recorded per sector for each file, an area for entering a beginning address of the corresponding extent, and an area for entering an end address of said corresponding extent; and control means for accessing one of said extents by reference to said index area.

2. The memory card system as defined in claim 1, wherein said control means includes means for translating a given address into an address for accessing said memory card, on the basis of said number of bytes entered in said status indicating area.

3. A memory card comprising:
   a data area including a plurality of extents in each of which data is recorded by a file where the data is translatable based upon a number of bytes recorded per a sector per file, and
   an index area including in correspondence with each of the plurality of extents:
      an area for entering a file name, a status indicating area for entering the number of bytes to be recorded per sector per file,
      an area for entering a beginning address of the corresponding extent, and
      an area for entering an end address of the corresponding extent.

4. An access method for at least one of reading data from a memory card and writing data into the memory card, wherein the memory card has an index area, and a data area including a plurality of extents in which data is recorded in files for selective translation from the files with a variable sector byte density comprising a number of bytes to be recorded per a sector for each of the files, and wherein the index area corresponds with each of the plurality of extents and includes, at least, an area for entering a file name, a status indicating area for entering the number of bytes to be recorded per sector for each of the files, an area for entering a beginning address of the corresponding extent, and an area for entering an end address of the corresponding extent the method comprising:
   reading said index area to decide if a desired file name exists;
   reading said status indicating area in response to the existence of said desired file name to identify the variable sector byte density for the file of the desired file name; and
   translating a given address into an address for accessing said memory card, on the basis of said variable sector byte density entered in said status indicating area, and then accessing said memory card.

5. An access method for at least one of reading data from a memory card and writing data into the memory card, wherein the memory card has an index area, and data area including a plurality of extents in which data is recorded in files for selective translation from the files with a variable sector byte density comprising a number of bytes to be recorded per a sector for each of the files, and wherein the index area corresponds with each of the plurality of extents and includes, at least, an area for entering a file name, a status indicating area for entering the number of bytes to be recorded per sector for each of the files, an area for entering a beginning address of the corresponding extent, and an area for entering an end address of the corresponding extent, the method comprising:
   reading said index area to decide if a desired file name exists;
   reading said status indicating area in response to the existence of said desired file name to identify the variable sector byte density for the file of the desired file name; and
   translating a given address into an address for accessing said memory card, on the basis of said variable sector byte density entered in said status indicating area by applying the relationship, $$MCA = n \cdot TA + (SA - 1) \cdot D$$

wherein,
   MCA is a byte address of the memory card,
   n is a number of sectors/track,
   TA is a track address which begins with 0,
   SA is a sector address which begins with 1,
   D is a number of bytes/sector, which is entered in the status indication area; and, using said translated address to access said memory card to perform read/write functions.

6. A memory card capable of reading and writing data arranged by track addresses and sector addresses such as are typically used by a floppy disc, the card comprising:
   a data area including a plurality of extents for storing files of data as bytes with a variable sector byte density comprising a preselected number of the bytes to be recorded per a sector per each of the files;
   an index area including a plurality of data set labels arranged in a one to one correspondence with the plurality of extents, each data set label including:
      a file name area for storing a name of a file corresponding to a one of the extents, the file containing data in a form of bytes;
      a beginning address area for storing a beginning address of the one extent;
      an ending address area for storing an end address of the one extent; and
      a status indicating area which identifies the variable sector byte density for each of the files, in a case where the data of the file specified in the file name is to be read and written to and from a floppy disc, and wherein sectors of varying sizes are read and written.

7. The memory card as claimed in claim 6 wherein the beginning address stored in the beginning address area is the track address of the floppy disc and, whereby the ending address stored in the beginning address area is the sector address of the floppy disc.

8. The memory card as claimed in claim 6 wherein the memory card is arranged to be compatible with floppy discs of 128 bytes/sector, 256 bytes/sector, 1024 bytes/sector.

9. The memory card as claimed in claim 6 further including error checking means for checking for errors of data written to the memory card and data read from the memory card.

* * * * *